Patented Nov. 28, 1933

1,936,670

UNITED STATES PATENT OFFICE 1,936,670

LUBRICATING OIL

Alfred Henriksen and Bert H. Lincoln, Ponca City, Okla., assignors to Continental Oil Company, Ponca City, Okla., a corporation of Delaware No Drawing. Application January 20, 1933
Serial No. 652,691

2 Claims. (Cl. 87—9)

Our invention relates to high quality lubricating oils and specifically comprises such products as new compositions of matter.

Present day design of mechanical devices calls for higher and higher pressures on rubbing surfaces. The designers are, however, limited to pressures at the rubbing surfaces which are below the pressure at which high quality lubricating oil will break down in use and allow metal to metal contact which results in seizure. The lubricant between two rubbing surfaces is spread out in a relatively thin film and if the lubricant does not have high film strength it will break down with subsequent damage to the machine. Conventional hydrocarbon lubricants vary in their film strength. The very highest quality lubricants do not have sufficiently high film strength properties for the designers of mechanical devices to take advantage of the improvements which might be achieved with higher rubbing surface pressures.

The primary object of this invention is to provide lubricants with greatly increased film strength in an economical manner.

In general, our invention comprises the addition of halogenated diphenylene oxide to hydrocarbon lubricants.

For example, diphenylene oxide is melted and chlorine passed into it. The reaction takes place readily with the generation of heat. Addition of chlorine may be continued until sufficient chlorine has been added to the diphenylene oxide to represent mono-chlor diphenylene oxide or the quantity doubled for the di-chlor product, and so on for the tri-chlor, etc. It is fully appreciated that the straight mono-chlor product is not made but that the mixture contains the same quantity of chlorine as is found in monochlor diphenylene oxide. The same is true for the di, tri, etc. products. When the desired weight of chlorine has been added to the diphenylene oxide, the reaction is stopped and the reaction mixture purified or freed of excess chlorine and/or hydrogen chloride. The purified product is then ready for addition to hydrocarbon lubricants.

It is to be understood that other halogens may be used. Fluorine is difficult to handle commercially. Iodine and bromine may be employed. The brominated product does not give as high film strength as the chlorinated product. The iodated products are less soluble in hydrocarbon oils. We prefer, therefore, to use chlorinated diphenylene oxide—but it is to be understood that any halogenated diphenylene oxide is within the scope of our invention. This will be understood by those skilled in the art, inasmuch as the halogen family are similar in their properties.

To purify the reaction mixture any one or more of the usual methods may be used. The mixture may be dissolved in petroleum ether and the solution well washed with water, followed by a distillation to remove the petroleum ether. Purification may be accomplished by washing with solutions of alkalies, by clay or fuller's earth contacting, by low temperature vacuum distillation, or by a combination of two or more of these methods.

To prove the increased film strength of the lubricants prepared by this invention we have used the Timken testing machine, which machine has been described in the literature of the art and by the Timken Roller Bearing Company. This machine determines the pressure at which a lubricating oil will break down to allow metal to metal contact. In making the test, weights are added one by one at regular intervals which increase the load or pressure at the rubbing surface. The number of pound weights added before the oil film ruptures is a measure of the film strength of the lubricant being used in the test. These pound weights may be converted into approximate pounds per square inch pressure on the rubbing surface. In the tests given below a very high quality hydrocarbon lubricant falling under the SAE 40 classification was used.

|  | Pound weights at seizure point | Pounds per sq. in. pressure on rubbing surfaces |
|---|---|---|
| SAE 40 straight | 11.3 | 7,000 |
| 99% SAE 40 plus 1% diphenylene oxide with a chlorine content equivalent to the monochlor product | 32.9 | 19,000 |
| 99% SAE 40 plus 1% diphenylene oxide with a chlorine content equivalent to the dichlor product | 28.0 | 16,500 |

The above examples show the marked improvement in film strength accomplished by our invention.

This invention is not limited to lubricants falling within the S. A. E. classification but is applicable to all hydrocarbon lubricants irrespective of viscosity or classification.

In the example given, 1% of the halogenated diphenylene oxide was added. Smaller or larger amounts may be required and may range from about 0.1% on up to 10% or above.

It is not necessary to add sufficient halogen to the diphenylene oxide for it to have a halogen content equivalent to the monochlor product, since 1% halogen content may be used with partial success and as much as 65% halogen content may be employed.

The diphenylene oxide of commercial purity is satisfactory for our invention.

Having thus described our invention, what we claim is:

1. A lubricating oil comprising in combination a small amount of halogenated diphenylene oxide and a hydrocarbon oil.

2. A lubricating oil comprising in combination a hydrocarbon oil and a small quantity of chlorinated diphenylene oxide.

ALFRED HENRIKSEN.
BERT H. LINCOLN.